(12) United States Patent
Polig

(10) Patent No.: US 11,524,211 B2
(45) Date of Patent: Dec. 13, 2022

(54) EXPRESS SLING FOR THE SPORT OF CLIMBING WITH A LIFT SYSTEM AND VISUAL DISPLAY FOR THE USE FREQUENCY

(71) Applicant: Vertical-Life SRL, Bressanone (IT)

(72) Inventor: Matthias Polig, Racines (IT)

(73) Assignee: Vertical-Life SRL, Bressanone (IT)

( * ) Notice: Subject to any disclaimer, the term of this patent is extended or adjusted under 35 U.S.C. 154(b) by 758 days.

(21) Appl. No.: 16/553,987

(22) Filed: Aug. 28, 2019

(65) Prior Publication Data

US 2019/0381359 A1    Dec. 19, 2019

Related U.S. Application Data

(63) Continuation of application No. PCT/EP2018/000074, filed on Feb. 23, 2018.

(30) Foreign Application Priority Data

Feb. 28, 2017 (IT) .................. 102017000022331

(51) Int. Cl.
*A63B 27/00* (2006.01)
*A63B 29/02* (2006.01)
(Continued)

(52) U.S. Cl.
CPC .......... *A63B 29/02* (2013.01); *A63B 69/0048* (2013.01); *G01P 15/02* (2013.01); *A62B 35/04* (2013.01)

(58) Field of Classification Search
CPC ..... A63B 29/02; A63B 69/0048; G01P 15/02; A62B 35/04
See application file for complete search history.

(56) References Cited

U.S. PATENT DOCUMENTS 4,508,193 A * 4/1985 Forrest ............. A62B 1/06
182/5
7,036,780 B1 * 5/2006 Geninatti ............ A63B 29/02
114/230.1

(Continued)

FOREIGN PATENT DOCUMENTS

CH          688573 A5    11/1997
WO    WO-2014195651 A1    12/2014

OTHER PUBLICATIONS

International Search Report PCT/ISA/210 for International Application No. PCT/EP2018/000074 dated Feb. 23, 2018.

*Primary Examiner* — Howard D Brown, Jr.
(74) *Attorney, Agent, or Firm* — Harness, Dickey & Pierce, P.L.C.

(57) ABSTRACT

A quickdraw for sport climbing includes two carabiners held together by a connecting element having a central region which ends in a loop for the carabiners at each of the two end regions. This connecting element is provided with at least one sensor in the central region between the loops or near to one of the loops. As a result of a minimal movement or touch of the quickdraw, the at least one sensor, triggered by use of the quickdraw, emits an electronic signal which is received by a base station communicating with a smartphone and/or a computer so that the signal can be processed, stored and compared with previously stored signals in order to show or graphically represent the corresponding values resulting therefrom on the display.

10 Claims, 6 Drawing Sheets

(51) Int. Cl.
   *A63B 69/00*      (2006.01)
   *G01P 15/02*      (2013.01)
   *A62B 35/04*      (2006.01)

(56) References Cited

U.S. PATENT DOCUMENTS

| | | | | |
|---|---|---|---|---|
| 2005/0183904 | A1* | 8/2005 | Bacalso | A63B 29/08 |
| | | | | 182/5 |
| 2005/0275230 | A1* | 12/2005 | Barrett | A63B 29/02 |
| | | | | 294/210 |
| 2011/0047764 | A1* | 3/2011 | Strasser | F16B 45/021 |
| | | | | 24/599.5 |
| 2011/0103558 | A1* | 5/2011 | Hooten | A62B 35/04 |
| | | | | 379/37 |
| 2015/0027808 | A1* | 1/2015 | Baillargeon | A62B 35/0025 |
| | | | | 182/19 |
| 2017/0283011 | A1* | 10/2017 | Pettinger | B63B 27/18 |
| 2017/0296877 | A1* | 10/2017 | Bennett | A63B 69/0048 |
| 2019/0366141 | A1* | 12/2019 | Cylvick | A63B 21/4011 |

* cited by examiner

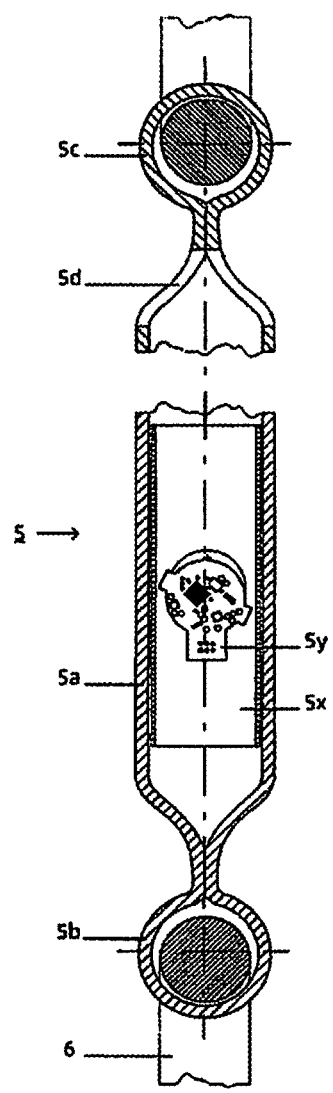
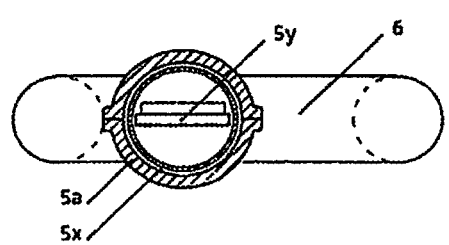
FIG. 2
FIG. 3

EXPRESS SLING FOR THE SPORT OF CLIMBING WITH A LIFT SYSTEM AND VISUAL DISPLAY FOR THE USE FREQUENCY

CROSS-REFERENCE TO RELATED APPLICATIONS

This application is a continuation of and claims the benefit under 35 U.S.C. § 365(c) to, International Application No. PCT/EP2018/000074, filed Feb. 23, 2018, which claims priority to Italian Application No. 102017000022331, filed Feb. 28, 2017, the entire contents of each of which are incorporated herein in its entirety by reference.

BACKGROUND OF THE INVENTION

The invention relates to an express sling for the sport of climbing.

A connecting sling with two carabiners, generally referred to as "express sling," is a safety device that allows a sportsperson to hook in his or her own rope at a safety point, wherein this offers several safety advantages and makes climbing easier. As is known, sports climbing structures which imitate artificial walls and grips and are provided with multiple safety points and a target area at the upper end of the climbing route, also referred to as "chain," the various safety points as well as the target area are provided with express slings, which are replaced for safety reasons following a specific use period. These known express slings are attached with a carabiner at the respective safety points and the target point, respectively the "chain." During the climbing, the sportsperson progressively attaches his or her rope to the second (free) carabiner of the respective express sling. The use of the express sling in place of the individual carabiner has several advantages, such as a less obstructed movement of the rope along a course that is closer to the ideal upward movement line (less emphasized zig-zag line), a greater distance between rope and wall, an optimum use of the rope length (less zig-zag).

The aforementioned advantages have resulted in a fast and wide distribution of express slings for the sports climbing on artificial climbing walls, on climbing structures and crags. For the training as well as for climbing competitions, it is important to know the positions of the individual express slings used and thus the safety points and their sequential arrangement as well as the time needed for moving from one safety point or safety sling to the next, respectively to the "chain." To further achieve an optimum use of all climbing routes provided on a climbing structure, it is important to know the frequency of use for the individual routes, in order to determine possible reasons for the preferred use or lack of use, so that changes can be made to increase the degree of use for less used routes. The gathering of information relating to the use frequency of the individual routes is based on observations by personnel assigned to it and can be carried out based on questions posed to the users. Collecting data relating to the specified times and the sequence of the safety points used during the climbing is difficult and not very precise. Collecting said data is generally carried out by a person "on the ground" and depends on his or her viewing capacity and the ability to react. It is furthermore difficult to detect those individual regions of the different routes where falls frequently occur, or those which can be climbed too easily by the users. The use of video cameras for recording and collecting information on the user frequency of the different routes and the aforementioned more or less difficult regions is known. However, a system equipped with several video cameras is expensive and the evaluation of the recordings is very time consuming and subjective and in particular the detection and evaluation of the regions that require a change in the route is difficult.

The document US 20150027808 A1 discloses a safety device for persons, consisting of an "intelligent" safety rope that automatically transmits a signal to the rescue personnel, but only during the fall of an employee secured to this rope. This device is not suitable for signaling the use of the "intelligent safety rope" by a sportsperson during a climbing activity, without being activated by his or her fall or by a specific stress. The described system for notifying rescue personnel is furthermore not designed for signaling and recording the use and climbing through of several safety points provided with express slings by a sportsperson, so as to provide the sportsperson with different informational data but also to make possible an optimum use of a crag with diverse climbing routes.

Known from the US 20011/0103558 A1 is a "fall" safety device equipped with a stress sensor that transmits a warning signal to rescue personnel when it is activated. This device also is activated only in case of a fall and is not suitable for signaling the passage of a sportsperson using several safety points equipped with inventive express slings and for storing the data to provide usable information to the sportsperson and for the operation of the crag.

SUMMARY

At least one embodiment provides an express sling with a data collection system that provides a display of the user frequency, which is equipped to make possible:
  the precise gathering of information on the hook-in times at the different safety points or the times between the hook-in operations at the individual safety points along a climbing route;
  the recording of the time for reaching the target area (the "chain");
  the gathering of information on the position of the individually used safety points and/or the route used;
  the information gathering on the difficult regions and the "key regions" and/or the easy to traverse regions along the route;
  the gathering of information relating to the fall frequency at the individual safety points; and/or
  the gathering of information on the use frequency for the individual routes along the climbing structure.

At least one embodiment provides at least one sensor with signal processing device on the connecting element for the express sling which for the most part is made of textile material and is preferably replaceable, which sensor can detect any directional change or contact of the express sling by the sportsperson. The aforementioned signals can be received directly by a smart phone, a computer, or a specific receiver unit suitable for processing and/or displaying and/or storing these data, either autonomously or through transmitting them to a communicating smart phone or computer.

In one embodiment, the sensor can be a miniaturized version of an acceleration sensor, such as the ones used in smart phones as inclinometer for the purpose of rotating the monitor displays from vertical to horizontal, and vice versa. The sensor indicates any position change via an electronic signal that is recorded by modern measuring systems. If applicable, the sensor can be coupled with different sensors (e.g. infrared sensors, gyroscopic sensors, magnetometer sensors, NFC (near field communication) sensors. The individual signal from the individual express slings along a climbing route, transmitted by the sensor or sensors with the aid of the signal processor, is a specific "individual" signal (e.g. with specific frequency) for gathering data on the position and progressive use of the express slings along a climbing route, so as to make possible its detection and assignment to the corresponding position along the climbing route in relation to the other express slings that are used.

In one embodiment, the connecting element for the express sling can accommodate on its inside the sensor, together with the corresponding signal processor and a battery power adapter, to ensure a user-friendly removal for the purpose of a battery replacement, wherein this does not exclude an attachment on the outside with a separately formed pocket, or a sleeve, or a support element, e.g. in the form of a Velcro fastener. The latter type of use in particular lends itself to the target region which is generally defined by the "chain." Of course, the attachment of the sensor together with the signal processor and the battery occurs such that the functionality of the express sling is not reduced. The sensor together with the signal processor and the battery is advantageously housed inside a plastic sleeve, functioning as protective sleeve, with a design that favors the replacement of the battery.

BRIEF DESCRIPTION OF THE DRAWINGS

The invention is explained in further detail in the following, with the aid of the enclosed schematic drawings of example embodiment(s) of an express sling, wherein the purpose of the drawings is only explanatory and not limiting.

FIG. 2 shows a longitudinal section through the connecting element of the express sling according to the invention, along the sectional plane II-II shown in FIG. 1.

FIG. 3 shows a cross section through the connecting element of the express sling according to the invention, along the sectional plane shown in FIG. 1.

DETAILED DESCRIPTION

Figure 1:
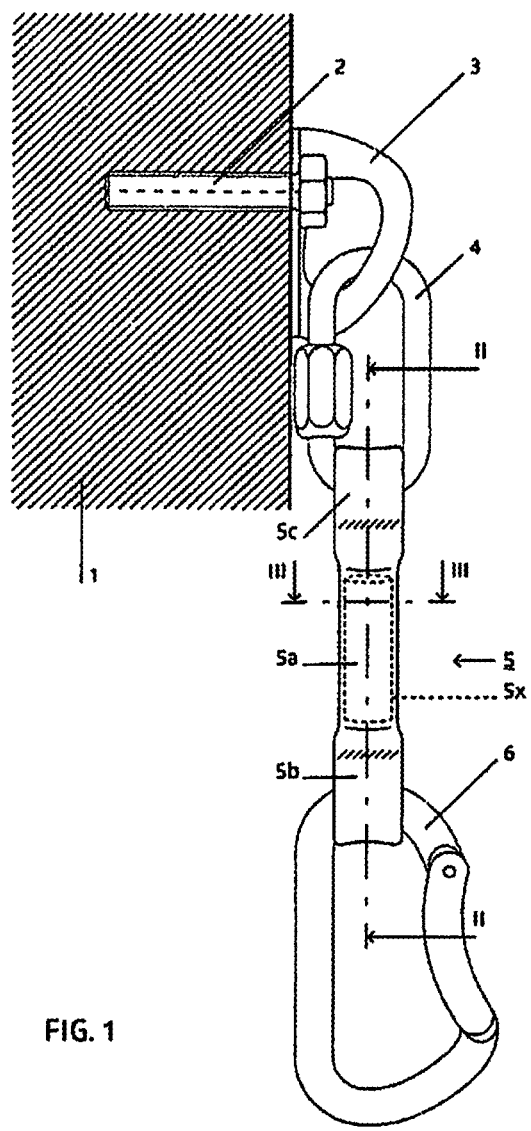
FIG. 1 shows a view from the side of an express sling according to an embodiment that is hooked into a safety point on a climbing wall.

In one embodiment, and referring to FIG. 1-3 the express sling includes, a first carabiner 4, possibly having a specific design for hooking it more easily into a ring 3 at a safety point that is attached with a screw 2 to the climbing wall 1; a connecting element 5 of a textile material;

a second carabiner 6, possibly having a specific design that is different from the carabiner 4, for easily hooking in the rope 8.

Figure 4:
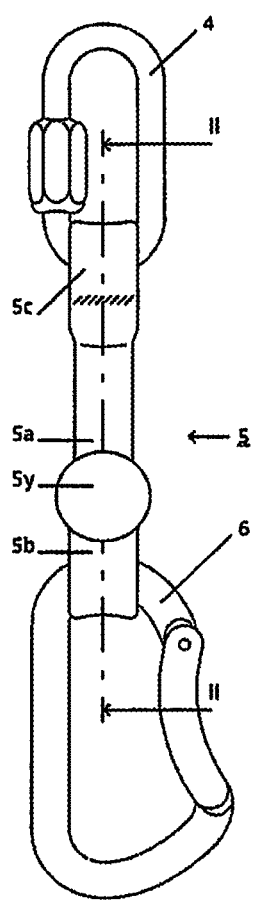
FIG. 4 shows a view from the side of an express sling according to an embodiment with the sensor, signal processor and battery, attached a Velcro fastener on the side to the outside of the express sling.
Figure 4A:
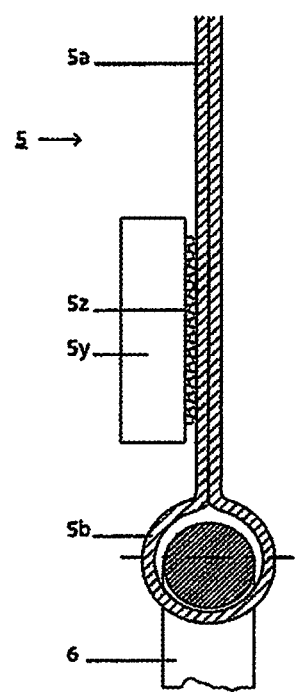
FIG. 4a shows a longitudinal section through the express sling, along the sectional plane II-II shown in FIG. 4, but on a larger scale.

The connecting element 5 can include a textile material band, of the type widely used for the known express slings, and is composed of a center longitudinal part 5a, having on one end a sling 5b for the carabiner 6 and on the opposite end a sling 5c for the carabiner 4. The longitudinal center part 5a is preferably tube-shaped and is provided with at least one opening near the sling 5c for attaching the carabiner 4 to the ring 3 of the safety point, which opening is suitable for inserting the tubular sleeve 5x that contains on the inside the sensor 5y with signal processor and battery power pack. The invention does not exclude housing the sensor 5y, together with the signal processor and the battery, in a sleeve of a different shape, such as a flat shape, which can be attached to the outside of the center portion 5a of the connecting element 5 or, for example, near the portion that encircles the carabiner 4 or 6. Separate pockets or recesses can be provided especially for the outside attachment which are accessible via Velcro fastener, for example, without excluding that the preferably flat protective sleeve 5x can be attached to the connecting element 5 or at the "chain" in the target region, for example by means of the Velcro fastener 5z (FIGS. 4, 4a).

Figure 6:
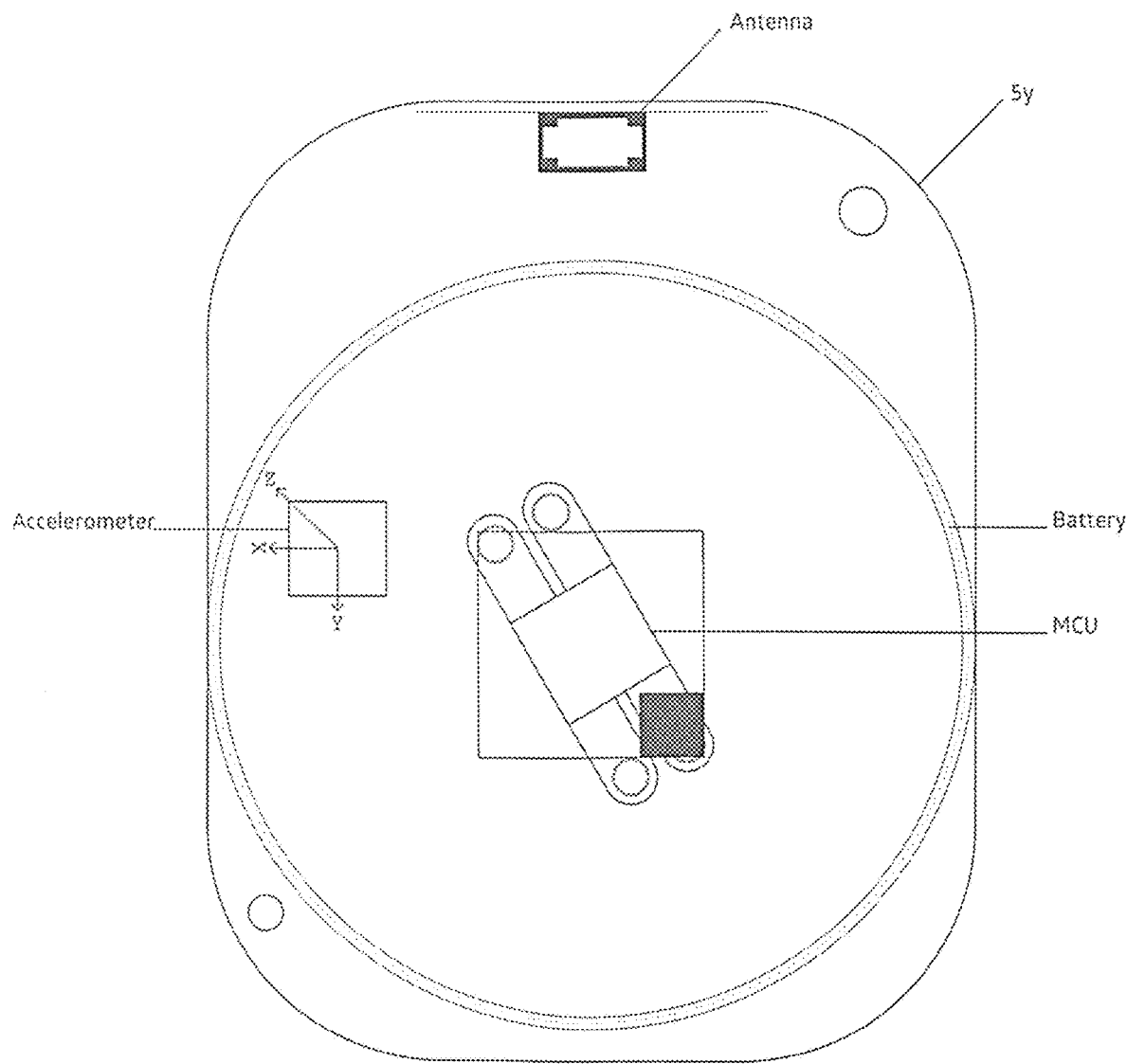
FIG. 6 illustrates an embodiment of the sensor of the express sling.

FIG. 6 illustrates an embodiment of the sensor 5y. As shown, the sensor 5y includes an accelerometer, a microprocessor MCU, a battery and an antenna. The elements of the sensor 5y are powered by the battery. The microprocessor MCU receives output of the accelerometer, and transmits signals based on the accelerometer output via the antenna. As described previously, the sensor 5y may include a different or additional sensing element than an accelerometer.

Figure 5:
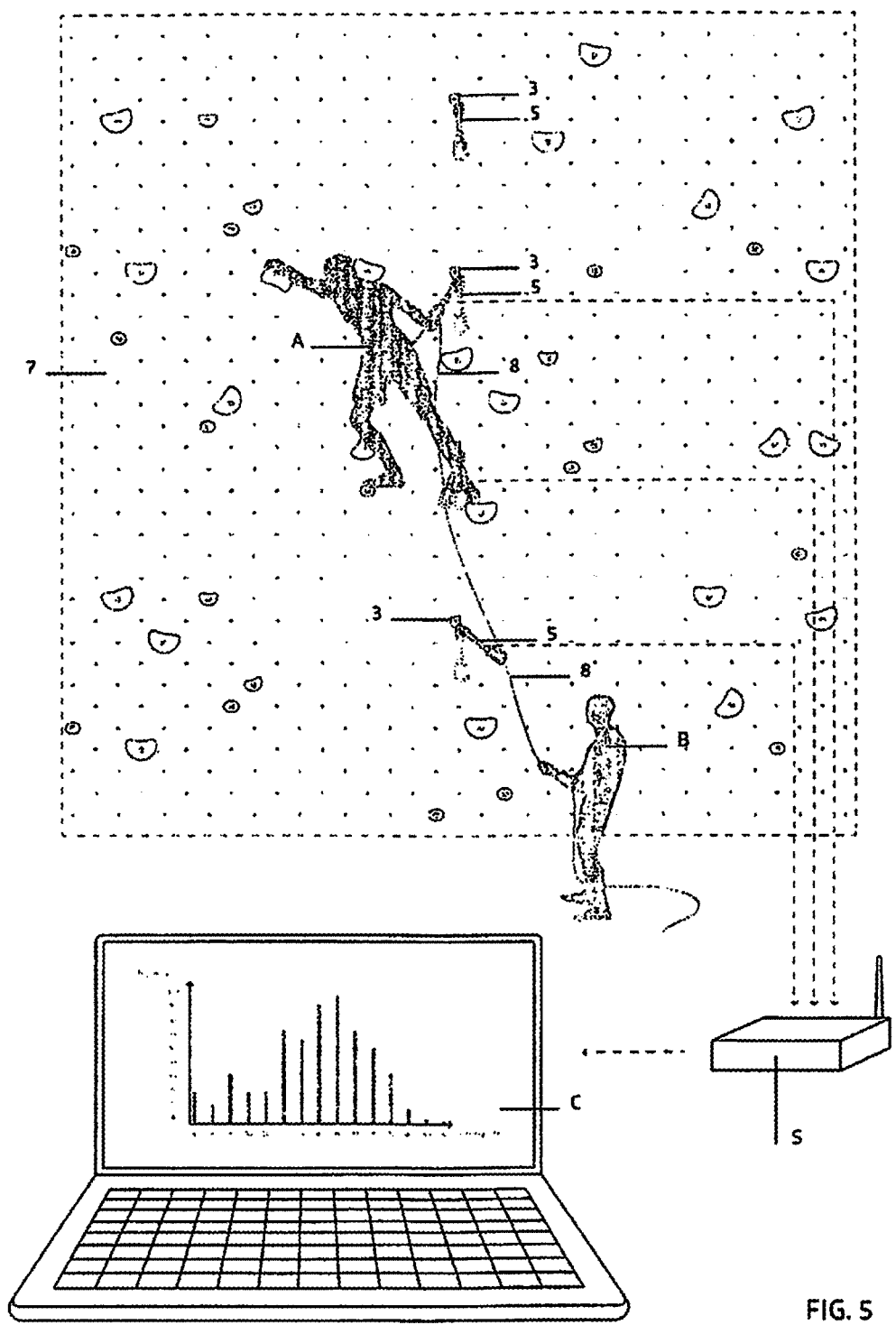
FIG. 5 shows a sportsperson on a climbing wall provided with several safety points having express slings according to the invention, and a base station for receiving the signals transmitted by the sensors of the individual inventive express slings activated by the sportsperson, as well as a PC for displaying the data/values transmitted via the base station.
Figure 7:
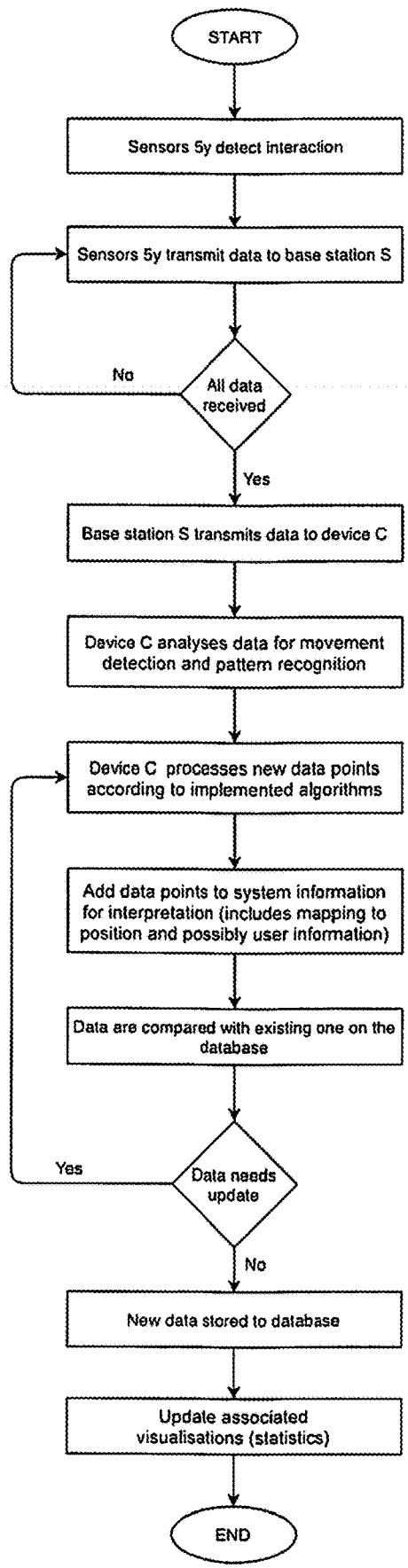
FIG. 7 illustrates a flow chart of the overall system operation.

In one embodiment, referring to FIG. 5, when climbing the wall 7 the sportsperson A hooks the rope 8 into various express slings 5 that are attached to the safety points with the rings 3 along a climbing route, thereby activating the individual sensors 5y. This activation occurs by changing the inclination of or coming in contact with the individual express slings 5 during the hooking-in of the rope 8, which is controlled by the safety person B at the bottom of the climbing wall 7. The activation of the individual sensors 5y thus will not occur because of a fall of the sportsperson A, but because the rope 8 is hooked into the individual express slings 5, respectively the ring 3 with express sling 5 at the safety points. The signals which are transmitted progressively during the climbing of the sportsperson A by the sensors 5y of the respectively used express slings 5 are received by a base station S, are recognized, and are transmitted to a smart phone or a computer where they are processed, displayed or shown and compared to values stored as a result of previous climbs along identical or different routes, so as to indicate the user frequency of the individual routes/safety points, thereby making it possible to improve or optimize the use of the individual routes, to evaluate the degree of difficulty and to display the total times or partial times required for climbing the routes, possibly also to display the record times. FIG. 7 illustrates a flow chart of overall system operation.

The invention claimed is:

1. An express sling for sports climbing, composed of two carabiners held together by a connecting element, wherein the connecting element has a center region and two end regions with respectively one sling for the aforementioned carabiners, wherein this connecting element is provided in the center region, between the slings or near one of the slings, with at least one sensor, that the at least one sensor configured to transmit an electronic signal as a result of movement or contact with the express sling by a user, which signal is configured to be received by a base station that communicates with a smart phone or a computer, so that the signal is processed, stored and can be compared to previously stored signals for displaying or graphically showing the resulting, corresponding values on a display monitor.

2. The express sling according to claim 1, wherein the at least one sensor is an accelerometer or an inertial accelerometer.

3. The express sling according to claim 1, wherein the at least one sensor is an infrared sensor, a gyroscopic sensor, a magnetometer sensor or near field communication sensor.

4. The express sling according to claim 1, wherein the signal generated by at least one sensor is processed by a signal processor and that the signal transmitted to the base station can be recognized as a specific signal for each individual express sling.

5. The express sling according to claim 1, wherein the sensor or the several sensors, together with the signal processor and the battery power pack are housed inside a tubular or flat protective sleeve with opening flap for the easy battery replacement.

6. The express sling according to claim 1, wherein the protective sleeve is inserted into the center section of the connecting element.

7. The express sling according to claim 1, wherein the protective sleeve is inserted into a separate pocket or secured with a Velcro fastener or other known fastening elements to the outside of the connecting element, or on the "chain" in the target region.

8. The express sling according to claim 1, wherein the sensor of the type of an acceleration sensor is combined with one or several sensors, such as gyroscopic sensors and/or magnetometer sensors, infrared sensors, near field communication sensors.

9. The express sling according to claim 1, wherein the at least one sensor is a gyroscopic sensor, or a magnetometer sensor, or an infrared sensor, or near field communication sensor.

10. An express sling for sports climbing, including two carabiners held together by a connecting element, wherein the connecting element has a center region and two end regions with respectively one sling for each of the carabiners, wherein this connecting element is provided in the center region, between the slings or near one of the slings, with at least one sensor, that the at least one sensor configured to transmit an electronic signal as a result of movement or contact with the express sling by a user.

* * * * *